(12) United States Patent
Blum et al.

(10) Patent No.: US 6,541,535 B1
(45) Date of Patent: Apr. 1, 2003

(54) HIGH POWERED RADIATION AND/OR THERMAL HARDENING COATING POWDER WITH A FUNCTIONALIZED BASED STRUCTURE

(75) Inventors: Rainer Blum, Ludwigshafen (DE); Rodriguez Jorge Prieto, Senden (DE)

(73) Assignee: BASF Coatings AG, Muenster (DE)

( * ) Notice: Subject to any disclaimer, the term of this patent is extended or adjusted under 35 U.S.C. 154(b) by 0 days.

(21) Appl. No.: 09/762,400

(22) PCT Filed: Aug. 3, 1999

(86) PCT No.: PCT/EP99/05625

§ 371 (c)(1), (2), (4) Date: Feb. 7, 2001

(87) PCT Pub. No.: WO00/08067

PCT Pub. Date: Feb. 17, 2000

(30) Foreign Application Priority Data

Aug. 7, 1998 (DE) .......................... 198 35 849

(51) Int. Cl.[7] .................. C08F 2/50; C08F 2/46; C08F 20/10; C08F 8/00; C08G 63/00; C09D 5/03

(52) U.S. Cl. ............. 522/35; 522/90; 522/98; 522/99; 522/100; 522/104; 522/170; 522/172; 522/173; 522/179; 522/181; 522/182; 522/183; 528/25; 528/26; 528/65; 528/75; 528/220; 528/272; 528/298

(58) Field of Search ................ 522/35, 90, 98, 522/99, 100, 104, 170, 172, 173, 179, 181, 182, 183; 528/25, 26, 65, 75, 220, 272, 298

(56) References Cited

U.S. PATENT DOCUMENTS

| | | | | |
|---|---|---|---|---|
| 4,113,593 A | * | 9/1978 | Barzynski et al. ............. 522/10 |
| 4,129,488 A | | 12/1978 | McGinniss .................. 204/159 |
| 4,148,987 A | * | 4/1979 | Winey ........................ 526/316 |
| 4,163,810 A | | 8/1979 | McGinniss .................... 427/54 |
| 5,068,305 A | | 11/1991 | Meixner et al. .............. 528/49 |
| 5,101,053 A | * | 3/1992 | Boettcher .................... 556/64 |
| 5,128,386 A | * | 7/1992 | Rehmer et al. ............... 522/35 |
| 5,252,682 A | | 10/1993 | Bayha ........................ 525/445 |
| 5,334,456 A | * | 8/1994 | Noren et al. ................ 428/431 |
| 5,360,863 A | * | 11/1994 | Meixner et al. .............. 525/28 |
| 5,484,850 A | | 1/1996 | Kempter et al. ............. 525/286 |
| 5,527,859 A | | 6/1996 | Kempter et al. ............. 525/301 |
| 5,605,941 A | * | 2/1997 | Steinmann et al. ......... 522/170 |
| 5,837,746 A | * | 11/1998 | Kohler et al. .................... 522/8 |
| 5,922,473 A | * | 7/1999 | Muthiah et al. ............. 428/481 |
| 6,005,017 A | * | 12/1999 | Daly et al. .................... 522/20 |
| 6,017,640 A | * | 1/2000 | Muthiah et al. ............. 428/514 |
| 6,106,905 A | * | 8/2000 | Blum et al. ................. 427/493 |
| 6,165,557 A | * | 12/2000 | Blum et al. | |
| 6,288,146 B1 | * | 11/2001 | Blum et al. | |

FOREIGN PATENT DOCUMENTS

| | | | |
|---|---|---|---|
| DE | 1 570 266 | | 8/1969 |
| DE | 42 26 520 | | 2/1994 |
| DE | 42 26 620 | | 2/1994 |
| EP | 0 322 808 | | 7/1989 |
| EP | 0 346 982 | | 12/1989 |
| EP | 410 242 | | 1/1991 |
| EP | 0 636 669 | | 2/1995 |
| EP | 0 650 978 | | 5/1995 |
| EP | 0 650 979 | | 5/1995 |
| EP | 0 650 985 | | 5/1995 |
| EP | 0 844 286 | | 5/1998 |
| GB | 2 010 284 A | * | 6/1979 |
| WO | WO 93/25596 | | 12/1993 |

OTHER PUBLICATIONS

Carlini et al, "Polymers Contianing Side–Chain Benzophenone Chromophores . . . ", Polymer, vol. 34, pp. 599–605, May, 1983.*

Ciardelli et al, "Advanced Polymeric Materials for Coating Technology", Journal of Coating Technology, vol. 61, No. 775, pp. 7 87, Aug. 1989.*

* cited by examiner

*Primary Examiner*—Susan W. Berman
(74) *Attorney, Agent, or Firm*—Keil & Weinkauf

(57) ABSTRACT

The invention relates to a binder for powder coating materials having an oligomeric or polymeric substructure which are curable thermally and/or by means of high-energy radiation, said binder comprising in each case terminally and/or laterally at least one vinyl ether group a) and at least one group b) which is different from the vinyl ether groups a) but is coreactive with said groups a), there being on average at least one vinyl ether group a) and one coreactive group b) per oligomer or polymer molecule. The invention also relates to powder coating materials comprising such a binder and to the use of said powder coating materials for coating surfaces, especially in the form of an automotive top coat and a coil coating material.

12 Claims, No Drawings

HIGH POWERED RADIATION AND/OR THERMAL HARDENING COATING POWDER WITH A FUNCTIONALIZED BASED STRUCTURE

This application is a 371 continuation of PCT/EP99/05625, filed Aug. 3, 1999.

The invention relates to a binder for powder coating materials curable thermally and/or by high-energy radiation, to the powder coating material comprising the binder, itself, and to its use in accordance with the invention.

UV-curable coating materials for use in liquid form, and powder coating materials, are continually acquiring more fields of use on the grounds of reduced solvent consumption. A major problem with known UV coating materials, however, is the inhibiting effect of atmospheric oxygen on curing at the film surface. To overcome this inhibition requires lamps with very high energy density, and accelerated curing by means of amine coinitiators. These amines are frequently the cause of odor nuisance.

In the case of UV powder coating materials, in addition, further problems arise from the contradictory requirements for good blocking resistance of the powders on storage and good leveling of the melted coating film. For good blocking resistance, the glass transition temperature and melting point should be as high as possible, whereas for good leveling, and to permit use on heat-sensitive substrates, they should be as low as possible, in order to prevent a curing reaction before optimum surface smoothness has developed and in order to prevent substrate damage. Likewise for the purpose of improving the surface smoothness, the melt should have a low viscosity and the reaction should set in only after a delay period. These concepts are difficult to realize with powder coating materials whose curing is based on one of the known, thermally activated reactions between resin and hardener, e.g., polyepoxy resin and dicarboxylic acid hardener, since a viscosity-increasing reaction sets in simultaneously with the melting process. In the case of radiation-curable powder coating materials, on the other hand, it should be possible to separate the melting process from crosslinking. In order to meet this requirement, various attempts have been disclosed in the prior art.

U.S. Pat. Nos. 4,129,488 and 4,163,810 disclose UV-curable powder coating materials having specific spatial arrangements of ethylenically unsaturated polymers. Here, the binder consists of an epoxy-polyester polymer in which the epoxy adduct is arranged spatially such that by means of a linear polymer chain it is at a distance from the polyester adduct. In addition, the polymer comprises a chemically bonded photoinitiator.

EP-A 0 650 978, EP-A 0 650 979 and EP-A 0 650 985 disclose copolymers whose essential constituent is a relatively high fraction of monomers having the structural unit of methacrylic acid. These monomers can be used as binders for UV-curable powder coating materials, and feature a relatively narrow molecular weight distribution.

EP-A 0 410 242 discloses binders for UV-curable powder coating materials, consisting of polyurethanes which have specific (meth)acryloyl groups, can be crosslinked without crosslinker components or peroxides, and are therefore stable on storage. Crosslinking by UV irradiation requires the addition of photoinitiators.

EP-A 0 636 669, furthermore, discloses a UV-curable binder for powder coating materials which consists of unsaturated polymers, which can include cyclopentadiene, and a crosslinking agent which has vinyl ether groups, vinyl ester groups or (meth)acrylic groups.

WO-A-93/25596 discloses polyacrylates, for use as automotive topcoats, which are functionalized with double bonds in a wide variety of ways.

DE-A 42 26 520 discloses liquid compositions comprising unsaturated polymer, in the form of unsaturated polyesters, and compounds containing (meth)acryloyl groups and/or vinyl ether groups. These compositions can be crosslinked both by means of free-radical initiators and by means of radiation curing, and are used as binders for coating materials. In the case of crosslinking by UV radiation it is necessary to add photoinitiators.

With the UV coating materials of the cited prior art, problems arise as a result of the need to employ coinitiators, generally amines, in order to provide high photosensitivity and to overcome the known oxygen inhibition of the surface. The elimination products of these photoinitiators remain in the cured coatings and are the cause of odor nuisance.

In addition, EP-A-0 322 808 has disclosed a prior art which reveals a liquid binder, curable by means of high-energy radiation, which consists of a mixture of an ethylenically unsaturated polyester component, which may also include an ethylenically unsaturated polyester oligomer, and a nonpolymerized vinyl ether component. In this case, the vinyl ether component is selected such that per molecule of the vinyl ether component it contains on average at least two vinyl ether groups which are able to react with the ethylenic double bonds of the polyester component.

Against the background of this prior art, it is an object of the present invention to provide a binder for powder coating materials which are curable thermally and/or by means of high-energy radiation and which when used is unaccompanied by oxygen inhibition of the film surface, so that it is possible to forego the use of malodorous amines and other coinitiators.

We have found that this object is achieved by a binder having in each case terminally and/or laterally at least one vinyl ether group a) and at least one, preferably copolymerizable group b) which is different from the vinyl ether groups a) but is coreactive with the groups a), there being on average at least one vinyl ether group a) and one coreactive group b) per oligomer or polymer molecule.

Powder coating materials which comprise such a binder surprisingly show high UV reactivity and no oxygen inhibition of the surface when cured in air. This has the advantage that it is possible to forego the use of amines and other coinitiators.

Also possible is curing to a B-stage, i.e., to a partially cured state in which the curing is interrupted and can be started again later.

In connection with the binder of the invention, mention should be made of the problem, known per se to the skilled worker, that in the course of the customary polymer synthesis, which takes place under statistical reaction conditions, and/or in the case of polymer-analogous functionalization, it is also possible for polymer molecules to be formed which are functionalized only in one way, e.g., with the vinyl ether groups a), or which are not functionalized at all. Since such polymeric substructures with little functionalization or none whatsoever may adversely effect the properties of the polymers of the invention, it is preferred to direct the preparation process such that minimal fractions of such minimally functionalized or completely unfunctionalized polymeric substructures are formed. Methods suitable for this purpose are known to the person skilled in the art of polymers. They include the use of excesses of substances which if unreacted can be separated off again later, or, if desired, the residence of the excess in the finished coating binder. It has been found that any residual fractions which nevertheless remain have essentially no adverse effect on the success of the invention when using the claimed binders.

The outstandingly high UV reactivity which is observed when the binder of the invention is used in powder coating materials curable thermally and/or by means of high-energy radiation, which is unaccompanied by oxygen inhibition of the surface, is attributed to the fact that functionalization of the polymeric substructure in the binders of the invention permits self-crosslinking to take place, whereas in the prior art the binder compositions are mixtures of substances which must only be crosslinked with one another.

The schematic structural principle of the binders of the invention can be illustrated as follows:

FIG. 1

In accordance with the structural principle depicted, the functional groups a) and b) can be linked to the polymeric substructure at the same point and/or different points, and they may arbitrarily terminate this substructure. The functional groups a) and b) may also be present more than once on the same group. Thus, for example, two glycidyl methacrylates can react at a terminal $NH_2$ group, or one molecule of ethanolamine divinyl ether at a terminal epoxy group. Furthermore, polymeric substructures having two or more OH groups laterally or terminally at the same site can be vinylated. The value for n here is between 0 and 6, preferably 1 or 2.

The oligomeric or polymeric substructure can be formed of C—C linkages which have double and/or triple bonds, and/or are selected from ester, ether, urethane, amide, imide, imidazole, ketone, sulfide, sulfone, acetal, urea, carbonate and siloxane linkages.

In addition, the oligomeric or polymeric substructure may be linear, branched, annular or dendrimeric in composition.

The binders of the invention are obtained preferably by polymer-analogous reaction of functional polymers with compounds having functional groups a) or b) and at least one further group which are able to react with the functional groups of the oligomeric or polymeric substructure.

Particularly suitable coreactive, preferably copolymerizable, functional groups b) are maleate, fumarate, (meth)acrylate, allyl, epoxy, alkenyl, cycloalkenyl, vinylaryl and cinnamate groups and/or preferably structural units of the formula I.

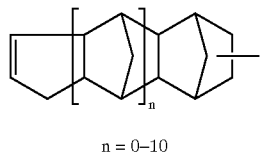

n = 0–10

When structural units of the formula I are used as functional group b), the powder coating materials are notable during preparation for low heat sensitivity and yet good stoving curability under atmospheric oxygen, for short curing times with combined use of heat and UV light, for good blocking resistance of the powders on storage, and for very good surface smoothness of the resultant coatings.

In one preferred embodiment, the structural units of the formula I in the coreactive groups b) can be incorporated in the form of esters of (oligo)dihydrocyclopentadienol with monofunctional or polyfunctional carboxylic acids of the formula II.

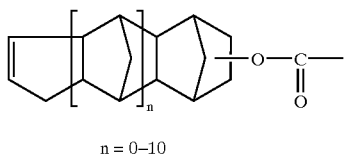

n = 0–10

An important polymer class of the invention is that of the epoxy resins. Suitable substructures are multiply epoxy-functional polymeric, oligomeric or monomeric compounds of the type, for example, of the bisphenol A epoxy compounds or bisphenol A epoxy resins, by reaction with compounds that are reactive with epoxy groups. The epoxy groups can be functionalized with compounds having vinyl ether groups a) and groups b) coreactive with them and contain at least one further group which is able to react with epoxides. Examples of compounds of this kind according to the invention are the products of partial reactions of conventional commercial epoxy resins with (meth)acrylic acid and/or compounds of the formula III below and an aminovinyl compound, such as aminobutyl vinyl ether or diethanolamine divinyl ether, or the reaction products of polyacrylates with copolymerized glycidyl (meth)acrylate with such compounds, or the reaction products of polyurethane resins obtained with such compounds with the additional use of hydroxy-functional epoxy compounds, an example being glycidol (2,3-epoxy-1-propanol).

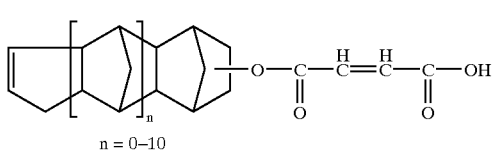

n = 0–10

Polyurethane resins constitute a further important class of polymer according to the invention, and are obtained by reacting polyfunctional isocyanate compounds with acrylates and vinyl compounds, hydroxyacrylates or aminoacrylates, and hydroxyvinylates or aminovinylates, with or without the additional use of further, isocyanate-reactive compounds, such as hydroxy compounds.

Isocyanate compounds which can be used include commercially customary and conventional compounds, such as tolylene diisocyanate (TDI), 4,4'-methylenedi(phenyl isocyanate) (MDI), isophorone diisocyanate (IPDI), hexamethylene diisocyanate (HMDI), further $C_2$–$C_{12}$ alkylene diisocyanates, further $C_2$–$C_{12}$ cycloalkylene diisocyanates, naphthalene diisocyanates, further alkaryl diisocyanates, such as phenylene diisocyanates, biphenyl diisocyanates, and the various positional isomers of these compounds. Also suitable are the derivatives of these isocyanates that are of higher isocyanate functionality, the products of biuretization and isocyanuratization, such as the isocyanates oligomerized or trimerized by way of uretdione groups, and the higher isocyanates obtainable from the simple isocyanates mentioned above by dimerization or oligomerization with amines or water.

Polyisocyanates which contain diisocyanurate groups are of particular importance. Particular mention may be made here of the trimerization products of the abovementioned diisocyanates.

To prepare the binders of the invention, these isocyanates, or mixtures thereof, are reactive with compounds which are reactive with the isocyanates and which in addition to the isocyanate-reactive groups also contain the groups a) and b). It is also possible to make use in addition of isocyanate-reactive compounds which do not contain the groups a) or b). The compounds to be reacted with the isocyanates can be singly or multiply reactive with isocyanates and can be linear, branched, aromatic, cycloaliphatic, araliphatic or heterocyclic and/or can be substituted in any desired manner. Examples are $C_1-C_{20}$ hydroxyalkyl vinyl ethers, such as hydroxyethyl monovinyl ether, hydroxybutyl monovinyl ether, cyclohexanedimethanol monovinyl ether, hexanediol monovinyl ether, ethylene glycol monovinyl ether, propylene glycol monovinyl ether and polyalkylene glycol monovinyl ethers, and also diethanolamine divinyl ether, aminopropyl vinyl ether, $C_1-C_{20}$-hydroxyalkyl (meth) acrylates, such as hydroxyethyl acrylate, hydroxybutyl acrylate and also polyalkylene glycol monoacrylates, allyl alcohol, dihydrodicyclopentadienol, hydroxyl-containing adducts of dicyclopentadienol (DCPD) with glycols, as per formula V below, ethylene glycol, polyethylene glycols, propylene glycol, polypropylene glycols, butanediol isomers, hexanediol, neopentyl glycol, trimethylolpropane, glycerol, pentaerythritol, unsaturated hydroxy compounds, such as allyl alcohol, partially etherified polyfunctional hydroxy compounds, examples being trimethylolethane monoallyl ether, trimethylolethane diallyl ether, trimethylolpropane monoallyl ether, trimethylolpropane diallyl ether, pentaerythritol monoallyl ether, pentaerythritol diallyl ether, alkylenediols, such as 2-butene-1,4-diol, and alkoxylated alkylenediols, preferably ethoxylated and propoxylated 2-butene-1,4-diol having a degree of alkoxylation of from 1 to 10 alkylene oxide units per mole of 2-butene-1,4-diol.

The selection and combination of the particular starting compounds desired depends on the desired properties of the binder to be prepared from them. The required molecular weight and, if desired, the viscosity can be established by additionally using monofunctional compounds. The above-mentioned measures, and the selection of a suitable polymerization technique with or without the additional use of solvents, and the control of the polymerization by means of catalysts, are possible for the skilled worker on the basis of his or her expert knowledge.

For the purposes of this invention, the term polyurethanes is intended to include not only those compounds whose main chain is linked by way of urethane linkages but also those compounds which have ester or ether chain links, i.e., the polyester urethanes and polyether urethanes.

Saturated and unsaturated polyester resins functionalized in accordance with the invention with groups a) and b) constitute a further important polymer class for the binders of the invention. Suitable for synthesizing the polyester resins are the customary and known carboxylic acids having >2 carboxyl groups and/or their anhydrides and/or their esters, and hydroxy compounds having >2 OH groups. It is also possible to use monofunctional compounds in addition in order, for example, to regulate the molecular weight of the polycondensates.

Examples of suitable carboxylic acid components are α,β-ethylenically unsaturated carboxylic acids, such as maleic acid, maleic anhydride, fumaric acid, itaconic acid, citraconic acid, saturated aliphatic carboxylic acids and their anhydrides, such as succinic acid, adipic acid, suberic acid, sebacic acid, azelaic acid, naturally occurring fatty acids and polymerized naturally occurring fatty acids, such as linseed oil fatty acid, dimeric linseed oil fatty acid and polymeric linseed oil fatty acid, castor oil, castor oil fatty acid, saturated cycloaliphatic carboxylic acids and their anhydrides, such as tetrahydrophthalic acid, hexahydrophthalic acid, endomethylenetetrahydrophthalic acid, norbonenedicarboxylic acid, aromatic carboxylic acids and their anhydrides, such as phthalic acid in its isomer forms, also tri- and tetracarboxylic acids and their anhydrides, such as trimellitic acid, pyromellitic acid, polycarboxylic acids partially esterified with allyl alcohol, examples being monoallyl trimellitate and diallyl pyromellitate; particular importance is attached to benzophenonecarboxylic acids, since by way of such carboxylic acids it is possible to incorporate, copolymerically, structures which can be excited by UV light.

Examples of suitable hydroxy components are alkoxylated or nonalkoxylated, at least dihydric, aliphatic and/or cycloaliphatic alcohols such as ethylene glycol, propylene glycol, polyethylene glycols, polypropylene glycols, butanediol isomers, hexanediol, tri-methylolpropane, pentaerythritol, neopentyl glycol, cyclohexanedimethanol, bisphenol A, hydrogenated bis-phenol A, OH-polyfunctional polymers, such as hydroxyl-modified polybutadienes or hydroxyl-bearing polyurethane prepolymers, glycerol, mono- and diglycerides of saturated and unsaturated fatty acids, especially monoglycerides of linseed oil or sunflower oil. Also suitable are unsaturated alcohols, such as polyfunctional hydroxy compounds etherified (partially) with allyl alcohol, examples being trimethylolethane monoallyl ether, trimethylolethane diallyl ether, trimethylolpropane monoallyl ether, trimethylolpropane diallyl ether, pentaerythritol monoallyl ether, pentaerythritol diallyl ether, 2-butene-1,4-diol and alkoxylated 2-butene-1,4-diol.

If monofunctional substances are employed to regulate the molecular weight, they are preferably monofunctional alcohols, such as ethanol, propanol, butanol, hexanol, decanol, isodecanol, cyclohexanol, benzyl alcohol, or allyl alcohol. In the context of the present invention, the term polyesters includes polycondensates which in addition to the ester groups feature amide and/or imide groups, as are obtained by the additional use of amino compounds. Polyesters modified in this way are known, for example, from DE-A-15700273 and DE-A-17200323. These polyesteramides or polyesterimides may in many cases meet certain requirements, in terms, for example, of heat stability, chemical resistance, hardness and scratch resistance—better than do pure polyesters.

The double bonds of the unsaturated polyesters used can also be subjected to an addition reaction with DCPD, thereby making it possible to incorporate endomethylenetetrahydrophthalic acid structures of the formula IV.

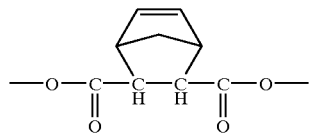

IV

These endomethylenetetrahydrophthalic acid structures can be present at the chain-internal double bonds of the polyesters and/or at terminal double bonds, as are introduced, for example, by way of substances of the formula III.

Groups a) and b) of the invention can be introduced by cocondensation and/or by polymer-analogous reactions at polyesters with functional groups. Examples of cocondensations are the combined use of trimethylolpropane diallyl and monoallyl ethers, pentaerythritol diallyl and monoallyl ethers, and 2-butene-1,4-diol, alkoxylated 2-butene-1,4-diol and allyl alcohol.

Examples of polymer-analogous reactions at polyesters with functional groups are reactions of addition onto incompletely condensed, linear and/or branched, prepolymeric polyester resins which possess free carboxyl groups and free OH groups. These resins can be reacted at the carboxyl groups with unsaturated glycidyl compounds and vinyl ethers. Preferably, first of all, the free carboxyl groups are reacted with unsaturated glycidyl compounds in order to prevent acid-catalyzed polymerization of the vinyl ethers. Examples of suitable unsaturated glycidyl compounds are glycidyl (meth)acrylate, glycidyl undecenoate, (meth) acrylization products of polyfunctional epoxy resins and/or allyl glycidyl ether, in which case preferably glycidyl (meth) acrylate is added on. Then, following these reactions, the hydroxyl groups are reacted with diisocyanates and hydroxyvinyl ethers.

It is preferred, however, first to react diisocyanates having isocyanate groups of different reactivity, such as isophorone diisocyanate, with half the equivalent amount of hydroxyvinyl ethers and then to react these reaction products with the prepolymeric polyesters. In the case of said reactions, hydroxyl-functional acrylates may also be used, in addition to the hydroxyvinyl ethers. In the manner described lastly, purely hydroxyl-functional prepolymeric polyesters can also be reacted with hydroxyvinyl ethers and hydroxyl-functional compounds having groups b), examples being hydroxyalkyl (meth)acrylates or allyl alcohol. The introduction of groups of the formula I in this way is likewise possible through the concomitant use of commercially available dihydrodicyclopentadienol. It is preferred, however, to introduce groups of the formula I by the cocondensation of the monoesters of maleic acid with dihydrodicyclopentadienol, of the formula III, into polyesters. These monoesters are obtainable in an elegant reaction from maleic anhydride (MAA), water and dicyclopentadiene (DCPD) or by a direct addition reaction of DCPD with MAA. In addition, it is possible to add DCPD directly onto other acids and/or acidic polyesters. These reactions, however, are usually less elegant and require catalysis with, for example, BF$_3$ etherate.

Furthermore, it is known from U.S. Pat. No. 5,252,682, for example, that in the reaction of DCPD and MAA there may to a minor extent be side reactions in accordance with the formula scheme V. Such byproducts likewise serve to introduce structures of the formula I.

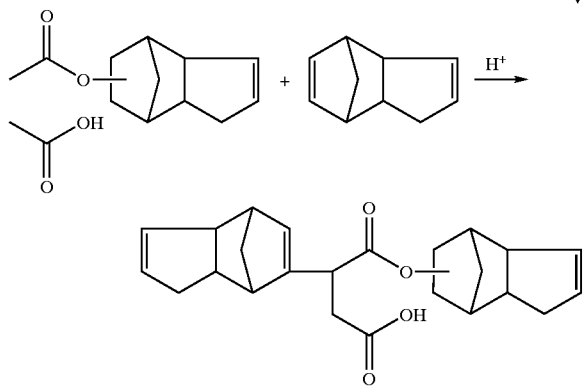

V

Hydroxyl-functional compounds for introducing groups of the formula I are dihydrodicyclopentadienyl alcohol and, preferably, the adducts of DCPD with glycols, which are obtainable inexpensively by acid catalysis in accordance with the formula scheme VI.

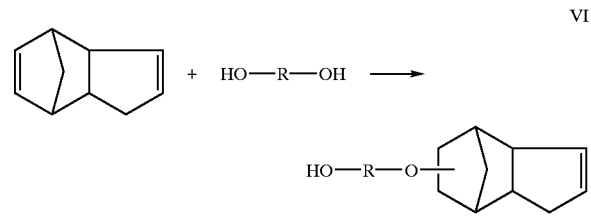

VI

Polyacrylate resins, which in accordance with the invention are functionalized with groups a) and b), constitute a further important class of polymer according to the invention and are obtained by copolymerizing acrylic esters, alone or with further copolymerizable compounds.

A preferred method of preparing polyacrylates is that of solvent-free, free-radical bulk polymerization in a stirred reactor, at atmospheric or superatmospheric pressure or, with particular preference, in continuous through-flow reactors at temperatures above the melting point of the resultant polymers, preferably above 140° C.

This method produces polyacrylates of low molecular weight and narrow molecular weight distribution, which is highly desirable in the case of powder coating materials owing to the resultant narrower melting range and the lower melt viscosity. In addition, bulk polymerization does away with the need to remove an auxiliary solvent, and it is possible to incorporate pigments and coating auxiliaries directly into the melt. Alternatively, the polyacrylate resins of the invention can be prepared in solvents.

Examples of components for synthesizing polyacrylate resins are the known esters of acrylic and methacrylic acid with aliphatic, cycloaliphatic, araliphatic and aromatic alcohols of 1 to 40 carbon atoms, such as, for example, methyl (meth)acrylate, ethyl (meth)acrylate, propyl (meth)acrylate, isopropyl (meth)acrylate, n-butyl (meth)acrylate, isobutyl (meth)acrylate, tert-butyl (meth)acrylate, amyl (meth) acrylate, isoamyl (meth)acrylate, hexyl (meth)acrylate, 2-ethylhexyl (meth)acrylate, decyl (meth)acrylate, undecyl (meth)acrylate, dodecyl (meth)acrylate, tridecyl (meth) acrylate, cyclohexyl (meth)acrylate, methylcyclohexyl (meth)acrylate, benzyl (meth)acrylate, tetrahydrofurfuryl (meth)acrylate, furfuryl (meth)acrylate and the esters of 3-phenylacrylic acid and the various isomeric forms thereof, such as methyl cinnamate, ethyl cinnamate, butyl cinnamate, benzyl cinnamate, cyclohexyl cinnamate, isoamyl cinnamate, tetrahydrofurfuryl cinnamate, furfuryl cinnamate, acrylamide, methacrylamide, methylolacrylamide, methylolmethacrylamide, acrylic acid, methacrylic acid, 3-phenylacrylic acid, hydroxyalkyl (meth) acrylates, such as ethyl glycol mono(meth)acrylate, butyl glycol mono(meth)acrylates, hexanediol mono(meth) acrylate, glycol ether (meth)acrylates, such as methoxyethyl glycol mono(meth)acrylate, ethyloxyethyl glycol mono (meth)acrylate, butyloxyethyl glycol mono(meth)acrylate, phenyloxyethyl glycol mono(meth)acrylate, glycidyl acrylate, glycidyl methacrylate, and amino (meth)acrylates, such as 2-aminoethyl (meth)acrylate.

Further suitable components are free-radically copolymerizable monomers, such as styrene, 1-methylstyrene, 4-tert-butylstyrene, 2-chlorostyrene, vinyl esters of fatty acids of 2 to 20 carbon atoms, such as vinyl acetate, vinyl propionate, vinyl ethers of alkanols of 2 to 20 carbon atoms, such as vinyl isobutyl ether, vinyl chloride, vinylidene chloride, vinyl alkyl ketones, dienes, such as butadiene and isoprene, and also esters of maleic acid and crotonic acid. Further suitable monomers are cyclic vinyl compounds, such as vinylpyridine, 2-methyl-1-vinylimidazole, 1-vinylimidazole, 5-vinylpyrrolidone and N-vinylpyrrolidone. Monomers with allylic unsaturation can also be employed, examples being allyl alcohol, allylalkyl esters, monoallyl phthalate and allyl phthalate. Acrolein and methacrolein, and polymerizable isocyanates, are also suitable.

Vinyl ether groups a) and co-reactive groups b) can be incorporated, by copolymerization during the preparation of the polyacrylates or, preferably, by subsequent polymer-analogous reaction. Examples of readily polymerizable compounds which additionally are reactive with vinyl ethers are copolymerizable epoxy compounds, such as glycidyl (meth)acrylate or dihydrodicyclopentadienol (meth) acrylate, dihydrodicyclopentadienyl ethacrylate and dihydrodicyclopentadienyl cinnamate. The epoxy groups of copolymerized glycidyl (meth)acrylate are able to polymerize with vinyl ethers directly by a cationic mechanism, but are also anchor groups for polymer-analogous functionalization reactions of the polymers, for the purpose, for example, of introducing acrylic double bonds by reaction with (meth)acrylic acid and/or for introducing vinyl ether groups by reaction with amino vinyl ether compounds, such as, for example, diethanolamine divinyl ether.

Dihydrodicyclopentadienyl groups of copolymerized dihydrodicyclopentadienyl compounds can be crosslinked or copolymerized directly with vinyl ether groups by initiation with UV irradiation and/or thermally, using free-radical donor compounds.

In principle, the invention is not restricted to the abovementioned classes of polymer. It can be an advantage to use mixtures of different polymer classes. In this case, particular preference is given to mixtures of relatively soft and elastic polyurethane resins or polyacrylate resins, which per se do not form blocking-resistant powders, with hard polyester resins having good blocking resistance properties.

The various functionalization methods referred to can be carried out in arbitrary combination in uniform polymeric precursors or mixtures of different polymeric precursors. This provides a kind of modular system which permits the properties of the powder coating materials to be adapted to a very wide variety of requirements.

The binders of the invention can also be mixed with further, preferably solid compounds which are reactive with the vinyl ether groups a) and/or with the groups b) that are co-reactive with said groups a), examples of such compounds being unsaturated, preferably partially crystalline polyesters, monomeric and/or polymeric acrylates, vinyl esters, vinyl ethers, allyl esters and allyl ethers, e.g., polyester acrylates, polyether acrylates, polyurethane acrylates and polyurethane vinyl ethers. In such mixtures as well, the disruptive oxygen inhibition of the surface is advantageously suppressed.

The invention also provides powder coating materials which comprise the binder of the invention and which can be cured thermally and/or by high-energy radiation, preferably UV light. Here, the powder coating materials can be crosslinked with a surprisingly high reactivity and even without coinitiators exhibit no oxygen inhibition of the surface. Furthermore, they can be cured with thermal free-radical donor compounds by baking.

The powder coating materials of the invention are cured with conventional photoinitiators of Norrish type I or II or with catalysts which, thermally, produce free radicals, such as peroxides, azo initiators or C—C-labile compounds, such as those of the pinacol type, for example. Furthermore, combinations featuring maleic and/or fumaric acid groups are in many cases curable in air by baking in customary coat thicknesses.

Particularly preferred photoinitiators are those which are bonded copolymerically. Examples of copolymerizable photoinitiators which can be employed are copolymerizable derivatives of benzophenone and compounds which are known from EP-A-486 897, DE-A-38 20 463, DE-A-40 07 318 and which embrace in particular those compounds derived from aromatic or partially aromatic ketones and have thioxanthone structures. Photoinitiators can also be incorporated by the addition reaction of, for example, hydroxybenzophenone onto copolymerized epoxy compounds, such as glycidyl (meth)acrylate, for example. Polymers which have, for example, copolymerically bonded benzophenone groups, in particular, can be crosslinked with high sensitivity by UV. This reactivity is further enhanced if at the same time structural units of the formula I are present as functional group b).

The powder coating materials of the invention can include compounds which, thermally or with high-energy radiation, provide free radicals and/or cations. Accordingly, curing can take place by purely thermal means, for example, by baking in air, and/or by means of high-energy radiation, with initiators, such as peroxides, azo initiators or C—C-labile compounds. The invention likewise provides for the use of the powder coating materials of the invention for coating surfaces. These surfaces can, quite generally, be flat or shaped, fibrous or particulate substrates of any desired materials, such as metal, wood, plastic, glass, ceramic, silicon, etc. The selection of the polymeric substructure to be combined and of the co-reactive groups b) for the binder of the respective powder coating material takes place in accordance with the requirements of the intended use in such a way that the finished coatings meet the set requirements. The basic principles governing the selection of the polymeric substructure and the co-reactive groups b) of the constituent monomers for establishing the basic properties of the coating materials are known to the polymer chemist and to the skilled worker.

The requirements imposed on the finished coatings can be very different. For clear topcoats of automotive metallic finishes, for example, the utmost yellowing resistance and weathering stability, scratch resistance and gloss retention are called for along with a high level of hardness.

In the case of a coil coating material, i.e., a coating material with which metal strips are coated, then wound up and processed further later, with deformation, important parameters are very high elasticity and adhesion. The price of the monomers may also be a selection criterion if for certain applications high quality of the coatings is not a particular requirement but a low price is.

For example, the hardness, glass transition temperature and softening point of the polymers can be increased by using higher proportions of "hard" monomers, such as styrene or the (meth)acrylates of C1 to C3 alcohols, whereas, for example, butyl acrylate, ethylhexyl acrylate or tridecyl acrylate, as "soft" monomers, lower these properties but at the same time improve the elasticity. Minor proportions of (meth)acrylic acid or (meth)acrylamide improve the adhesion.

The influences of the molecular weight, the molecular weight distribution, the control of the polymerization by means of regulators, temperature sensing and catalyst selection are fundamentally known.

Monomers which in addition to the double bond carry further functional groups can also be used for an additional heat-activatable crosslinking reaction. In general, however, they are employed in minor amounts in which they improve, for example, the adhesion, electrostatic chargeabiltiy, flow behavior of the coating materials, and surface smoothness. Derivatives of the 3-phenylacrylic acids, moreover, as incorporated stabilizers, improve the weathering stability of the coatings.

The coating formulations may additionally comprise customary coating auxiliaries, such as leveling assistants, devolatilizing assistants, other wetting agents and dispersants, colorants, and fillers. Also possible are aqueous dispersions of the coating powders, known as powder slurries, in order to open up application in liquid form to the powder coating materials.

In the text below the intention is to illustrate the invention further with reference to examples:

EXAMPLES

Precursor 1

(Preparation of a monocarboxylic acid in accordance with formula scheme V)

| | |
|---|---|
| 710.80 g of dicyclopentadiene, 93% pure | (5.0 mol) and |
| 490.30 g of maleic anhydride | (5.0 mol) | are weighed out into a stirring flask equipped with heater and reflux condenser.
The mixture is heated to 125° C. under a gentle stream of nitrogen.

| | |
|---|---|
| 95.00 g of water | (5.0 mol + 5 g) | are added from a dropping funnel over the course of one hour. The mixture is allowed to react at 125° C. for one hour, during which a monocarboxylic acid is formed in accordance with formula scheme V. The substance is initially liquid but gradually begins to crystallize.

Precursor 2

(Preparation of an isophorone diisocyanate/vinyl ether adduct)

| | |
|---|---|
| 222 g of isophorone diisocyanate (IPDI) | 1.0 mol |
| 0.34 g of dibutyltin dilaurate (catalyst) | | are weighed out into a stirring flask equipped with heater and reflux condenser.
This initial charge is heated to 60° C. and, as a feed stream,

| | |
|---|---|
| 116 g of 1,4-butanediol monovinyl ether | 1.0 mol | are run in over one hour. An exothermic reaction takes place, the temperature being held at 60° C. by means of countercooling. Following the end of the feed stream, stirring is continued at 60° C. for one hour. This gives a viscose resin having an NCO content of 12.9%.

Precursor 3

(Preparation of an isophorone diisocyanate/acrylate adduct)

| | |
|---|---|
| 222.00 g of isophorone diisocyanate (IPDI) | (1 mol) |
| 0.34 g of dibutyltin dilaurate (catalyst) | |
| 0.33 g of tert-butyl cresol (polymerization inhibitor) | |
| 0.33 g of hydroquinone monomethyl ether (polymerization inhibitor) | |
| 0.33 g of phenothiazine (polymerization inhibitor) | | are weighed out into a stirring flask equipped with heater and reflux condenser.
This initial charge is heated to 60° C. and, as a feed stream,

| | |
|---|---|
| 116 g of hydroxyethyl acrylate (HEA) | (1.0 mol) | are run in over one hour. An exothermic reaction takes place, the temperature being held at 60° C. by means of countercooling. After the end of the feed stream, stirring is continued at 60° C. for one hour. This gives a viscose resin having an NCO content of 13.2%.

Example 1

Unsaturated Polyester with Vinyl Ether Groups, Acrylate Groups and Structures b) of the Formula I

| | |
|---|---|
| 240.00 g of dicyclohexanolpropane | (1 mol) |
| 236.00 g of 1,6-hexanediol | (2 mol) |
| 194.00 g of dimethyl terephthalate | (1 mol) |
| 0.67 g of tin acetate | | are weighed out into a laboratory stirring vessel equipped with anchor stirrer and jacket heating/cooling and with a top-mounted distillation attachment.

This initial charge is heated rapidly to 120° C. under a gentle stream of nitrogen and the temperature is then raised in stages to 190° C. over the course of 3 hours, the condensate which forms being removed by distillation.

The contents of the flask are cooled to 90° C., and then

| | |
|---|---|
| 516.80 g of precursor 1 | (2.0 mol) |
| 116.00 g of fumaric acid | (1.0 mol) |
| 120.00 g of dicyclohexanolpropane | (0.5 mol) |
| 4.00 g of dibutyltin dilaurate | |
| 0.50 g of hydroquinone | | are added.

This mixture is heated rapidly to 130° C. under a gentle stream of nitrogen and the temperature is then raised gradually to 190° C. over the course of 6 hours, the water of condensation which forms being removed by distillation. This gives a resin having an acid number of 4 and an OH number of 47. The temperature of the resin is reduced to 85° C. and then

| | |
|---|---|
| 160 g of precursor 2 and | |
| 160 g of precursor 3 | | are added rapidly to the viscous but still stirrable melt. During their addition, there is a marked reduction in the viscosity, and a slightly exothermic reaction is observed (temperature rise to about 90° C. over 30 minutes). Reaction is then allowed to continue at about 85° C. for 2 hours, during which the viscosity increases considerably, and free isocyanate can no longer be detected.

| | |
|---|---|
| 45 g of benzil dimethyl ketal | (photoinitiator) |
| 8 g of benzoin | (devolatilizing auxiliary) and |
| 10 g of Modaflow Powder III | (commercial leveling assistant, Monsanto) | are stirred into the melt over the course of 10 minutes and the resin melt is emptied from the bottom valve of the vessel, with gentle nitrogen pressure, onto aluminum foil. On cooling, the melt solidifies to a hard, grindable resin.

Example 2

Polyester with Vinyl Ether Groups and Structures b) of the Formula I

The procedure of Example 1 is repeated but reaction takes place not with a mixture of precursor 2 and 3 but with 320 g of precursor 2.

Example 3

Unsaturated Polyester with Vinyl Ether Groups and Acrylate Groups

| | |
|---|---|
| 240.00 g of dicyclohexanolpropane | (1 mol) |
| 236.00 g of 1,6-hexanediol | (2 mol) |
| 194.00 g of dimethyl terephthalate | (1 mol) |
| 0.67 g of tin acetate | | are weighed out into a laboratory stirring vessel equipped with anchor stirrer and jacket heating/cooling and with a top-mounted distillation attachment.

This initial charge is heated rapidly to 120° C. under a gentle stream of nitrogen and the temperature is then raised in stages to 190° C. over the course of 3 hours, the water of condensation which forms being removed by distillation.

The contents of the flask are cooled to 90° C., and then

| | |
|---|---|
| 146.00 g of adipic acid | (2 mol) |
| 116.00 g of fumaric acid | (1 mol) |
| 120.00 g of dicyclohexanolpropane | (0.5 mol) |
| 119.00 g of 1,6-hexanediol | (1.0 mol) |
| 4.00 g of dibutyltin dilaurate (DBTL) | |
| 0.50 g of hydroquinone | | are added.

This mixture is heated rapidly to 130° C. under a gentle stream of nitrogen and the temperature is then raised gradually to 190° C. over the course of 6 hours, the water of condensation which forms being removed by distillation. This gives a resin having an acid number of 6 and an OH number of 59. The temperature of the resin is reduced to 85° C. and then

| | |
|---|---|
| 160 g of precursor 2 and | |
| 160 g of precursor 3 | | are added rapidly to the viscous but still stirrable melt. During their addition, there is a marked reduction in the viscosity, and a slightly exothermic reaction is observed (temperature rise to about 90° C. over 30 minutes). Reaction is then allowed to continue at about 85° C. for 2 hours, during which the viscosity increases considerably, and free isocyanate can no longer be detected.

| | |
|---|---|
| 45 g of benzil dimethyl ketal | (photoinitiator) |
| 8 g of benzoin | (devolatilizing auxiliary) and |
| 10 g of Modaflow Powder III | (commercial leveling assistant, Monsanto) | are stirred into the melt over the course of 10 minutes and the resin melt is emptied from the bottom valve of the vessel, with gentle nitrogen pressure, onto aluminum foil. On cooling, the melt solidifies to a hard, grindable resin.

Example 4

Polyester with Vinyl Ether Groups and Acrylate Groups

| | |
|---|---|
| 240.00 g of dicyclohexanolpropane | (1 mol) |
| 236.00 g of 1,6-hexanediol | (2 mol) |
| 194.00 g of dimethyl terephthalate | (1 mol) |
| 0.67 g of tin acetate | | are weighed out into a laboratory stirring vessel equipped with anchor stirrer and jacket heating/cooling and with a top-mounted distillation attachment.

This initial charge is heated rapidly to 120° C. under a gentle stream of nitrogen and the temperature is then raised in stages to 190° C. over the course of 3 hours, the water of condensation which forms being removed by distillation.

The contents of the flask are cooled to 90° C., and then

| | |
|---|---|
| 219.00 g of adipic acid | (3.0 mol) |
| 120.00 g of dicyclohexanolpropane | (0.5 mol) |
| 119.00 g of 1,6-hexanediol | (1.0 mol) |
| 4.00 g of dibutyltin dilaurate (DBTL) | |
| 0.50 g of hydroquinone | | are added.

This mixture is heated rapidly to 130° C. under a gentle stream of nitrogen and the temperature is then raised gradually to 190° C. over the course of 6 hours, the water of condensation which forms being removed by distillation. This gives a resin having an acid number of 6 and an OH number of 56. The temperature of the resin is reduced to 85° C. and then 70 g of precursor 2 and
70 g of precursor 3 are added rapidly to the viscous but still stirrable melt. During their addition, there is a marked reduction in the viscosity, and a slightly exothermic reaction is observed (temperature rise to about 90° C. over 30 minutes). Reaction is then allowed to continue at about 85° C. for 2 hours, during which the viscosity increases considerably, and free isocyanate can no longer be detected.

| 45 g of benzil dimethyl ketal | (photoinitiator) |
| 8 g of benzoin | (devolatilizing auxiliary) and |
| 10 g of Modaflow Powder III | (commercial leveling assistant, Monsanto) | are stirred into the melt over the course of 10 minutes and the resin melt is emptied from the bottom valve of the vessel, with gentle nitrogen pressure, onto aluminum foil. The melt is much lower in viscosity than in the case of Examples 1 and 2. On cooling, the melt solidifies to a hard, grindable resin.

Example 5

Polyepoxy Resin with Vinyl Ether Groups and Acrylate Groups 1146 g of Epikote 828 (Shell, bisphenol A bisglycidyl resin
216 g of acrylic acid
15 g of triphenylphosphine
1.5 g of hydroquinone monomethyl ether are weighed out into a laboratory stirring vessel equipped with anchor stirrer and jacket heating/cooling and with a reflux condenser and this initial charge is heated to 70° C. under nitrogen. There follows a slightly exothermic reaction which results in warming to 90° C. and subsides after about 60 minutes. Stirring is continued at 80° C. for 120 minutes, after which the acid number has fallen to <1.

475 g of diethanolamine divinyl ether
are added dropwise to the resin over the course of one hour at 80° C., in an exothermic reaction. Stirring is continued at 80–85° C. for 30 minutes. The result is a viscose resin melt to which 40 g of benzil dimethyl ketal (photoinitiator) and
6 g of benzoin (degassing auxiliary)
are added and are incorporated by stirring for 10 minutes. The resin melt is then emptied from the bottom valve of the vessel, under slight nitrogen pressure, onto aluminum foil. On cooling, the melt solidifies to a hard, grindable resin.

Testing of the Examples

Samples of the resins of Examples 1, 2 and 3 are ground to fine powders in a laboratory mill. Using a hand sieve, the powders are scattered onto degreased steel panels in an amount such that according to experience coating films about 30–50 μm thick are obtained. The steel panels were subsequently stored for 10 minutes on a hotplate with a surface temperature of 140° C. At that point the powder layers scattered on had melted to form clear resin films. Mounted above the hotplate at a distance of 30 cm to the resin surface was a UV mercury vapor lamp with an emission maximum at about 365 nm and an energy output of 24 mJ/cm$^2$ in the plane of exposure.

While the powder coverings melted, the lamp was switched on and masked using a slide. After the powder coverings had melted, the slide was opened for 20 seconds and then closed again. The test panels were removed from the hot plate and allowed to cool. This resulted in hard colorless to pale yellowish coating films which were unattacked after 10 minutes of subjection to a cotton pad wetted with acetone.

We claim:

1. A powder coating material curable thermally and/or by means of high-energy radiation, which comprises an oligomeric or polymeric binder which is curable thermally and/or by means of high-energy radiation, wherein the binder oligomer or polymer comprises, in each case terminally and/or laterally, at least one vinyl ether group a) and at least one group b) which is different from the vinyl ether groups a) and is coreactive with said groups a), and wherein on average at least one vinyl ether group a) and one group b) is present per oligomer or polymer, and wherein the powder coating material further comprises at least one photoinitiator which has been copolymerized into the binder oligomer or polymer.

2. The powder coating material defined in claim 1, wherein the groups b) are copolymerizable with the vinyl ether groups a).

3. The powder coating material defined in claim 1, wherein the oligomer or polymer is formed of C—C linkages and/or linkages selected from ester, ether, urethane, amide, imide, imidazole, ketone, sulfide, sulfone, acetal, urea, carbonate and siloxane linkages.

4. The powder coating material defined in claim 1, wherein the oligomer or polymer is linear, branched, annular or dendrimeric.

5. The powder coating material defined in claim 1, wherein the groups b) are selected from the group consisting of maleate, fumarate, (meth)acrylate, allyl, epoxy, alkenyl, cycloalkenyl, vinylaryl and cinnamate groups, and groups of formula I

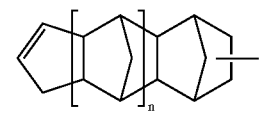

I wherein n is from 0 to 10.

6. The powder coating material defined in claim 5, wherein the group of formula I is linked to the binder oligomer or polymer in form of an ester of (oligo) dihydrodicyclopentadienol and a monofunctional or polyfunctional carboxylic acid, said ester comprising a moiety of formula II

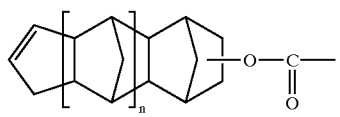

II wherein n is from 0 to 10.

7. The powder coating material defined in claim 6, wherein the monofunctional or polyfunctional carboxylic acid is maleic acid or fumaric acid, and the ester is bonded to the binder oligomer or polymer by way of ester linkage or an amide linkage.

8. An oligomeric or polymeric binder for powder coating materials, which binder is curable thermally and/or by means of high-energy radiation, wherein the oligomer or polymer comprises, in each case terminally and/or laterally, at least one vinyl ether group a) and at least one group b) which is different from the vinyl ether groups a) and is coreactive with said groups a), wherein on average at least one vinyl ether group a) and one group b) is present per oligomer or polymer, and wherein the groups b) comprise groups of formula I

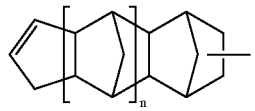

wherein n is from 0 to 10, and
wherein the group of formula I is linked to the binder oligomer or polymer in form of an ester of (oligo) dihydrodicyclopentadienol and a monofunctional or polyfunctional carboxylic acid, said ester comprising a moiety of formula II

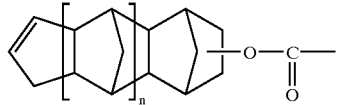

wherein n is from 0 to 10.

9. The binder defined in claim 8, wherein the groups b) are copolymerizable with the vinyl ether groups a).

10. The binder defined in claim 8, wherein the oligomer or polymer is formed of C—C linkages and/or linkages selected from ester, ether, urethane, amide, imide, imidazole, ketone, sulfide, sulfone, acetal, urea, carbonate and siloxane linkages.

11. The binder defined in claim 8, wherein the oligomer or polymer is linear, branched, annular or dendrimeric.

12. The binder defined in claim 8, wherein the monofunctional or polyfunctional carboxylic acid is maleic acid or fumaric acid, and the ester is bonded to the binder oligomer or polymer by way of an ester linkage or an amide linkage.

* * * * *

UNITED STATES PATENT AND TRADEMARK OFFICE
CERTIFICATE OF CORRECTION

PATENT NO.    : 6,541,535 B1
DATED         : April 1, 2003
INVENTOR(S)   : Blum et al.

It is certified that error appears in the above-identified patent and that said Letters Patent is hereby corrected as shown below:

<u>Column 17,</u>
Line 2, "of ester" should be -- of an ester --.

Signed and Sealed this

Eighth Day of July, 2003

JAMES E. ROGAN
*Director of the United States Patent and Trademark Office*